(12) United States Patent (10) Patent No.: US 11,813,626 B2
Kim et al. (45) Date of Patent: Nov. 14, 2023

(54) ELASTIC MEMBER AND PUMP ASSEMBLY COMPRISING SAME

(71) Applicant: Yonwoo Co., Ltd., Incheon (KR)

(72) Inventors: Chul Ki Kim, Incheon (KR); Seong Ho Kim, Incheon (KR); Dong Jin Lim, Incheon (KR)

(73) Assignee: YONWOO CO., LTD., Incheon (KR)

( * ) Notice: Subject to any disclaimer, the term of this patent is extended or adjusted under 35 U.S.C. 154(b) by 0 days.

(21) Appl. No.: 17/784,790

(22) PCT Filed: Sep. 24, 2020

(86) PCT No.: PCT/KR2020/012983
§ 371 (c)(1),
(2) Date: Jun. 13, 2022

(87) PCT Pub. No.: WO2021/118025
PCT Pub. Date: Jun. 17, 2021

(65) Prior Publication Data
US 2023/0001436 A1 Jan. 5, 2023

(30) Foreign Application Priority Data
Dec. 12, 2019 (KR) .................. 10-2019-0166125

(51) Int. Cl.
*B05B 11/00* (2023.01)
*B05B 11/10* (2023.01)

(52) U.S. Cl.
CPC ........ *B05B 11/1025* (2023.01); *B05B 11/105* (2023.01); *B05B 11/1077* (2023.01)

(58) Field of Classification Search
CPC .............. B05B 11/1025; B05B 11/105; B05B 11/1077; B05B 11/1074; B05B 11/1023;
(Continued)

(56) References Cited

U.S. PATENT DOCUMENTS

| 6,045,155 A * | 4/2000 | Cech ................ B60R 21/01516 |
| | | 177/144 |
| 2009/0102106 A1* | 4/2009 | Ohashi .................. F16F 1/3665 |
| | | 267/153 |

(Continued)

FOREIGN PATENT DOCUMENTS

| CN | 204368670 U | 6/2015 |
| CN | 107264970 A * | 10/2017 ......... B05B 11/3023 |

(Continued)

*Primary Examiner* — Bob Zadeh
(74) *Attorney, Agent, or Firm* — Bridgeway IP Law Group, PLLC; Sang Ho Lee; Hyun Woo Shin (57) ABSTRACT

Provided is an elastic member according to an embodiment. The elastic member includes an upper support, a lower support provided under the upper support, and at least one elastic part configured to connect the upper support to the lower support, wherein the elastic part includes an upper support portion formed downward from the upper support, a lower support portion configured to extend upwardly from the lower support, and a connecting portion configured to connect the upper support portion to the lower support portion with a predetermined inclination and to be bent and deformed when the elastic member is pressed.

13 Claims, 8 Drawing Sheets

(58) Field of Classification Search
CPC .............. B05B 11/1042; B05B 11/1059; F16F 2224/025; F16F 1/025
See application file for complete search history.

(56) References Cited

U.S. PATENT DOCUMENTS

| | | | |
|---|---|---|---|
| 2012/0200018 A1* | 8/2012 | Paz ..................... | A47C 7/027 267/166.1 |
| 2012/0325861 A1* | 12/2012 | Pardonge ............ | B05B 11/1018 222/321.7 |
| 2015/0090741 A1* | 4/2015 | Laffey .................... | F16F 1/025 222/321.9 |
| 2017/0326567 A1 | 11/2017 | Santagiuliana | |
| 2019/0203792 A1* | 7/2019 | Deman ..................... | F16F 1/44 |
| 2023/0001436 A1* | 1/2023 | Kim ................... | B05B 11/1077 |

FOREIGN PATENT DOCUMENTS

| | | | | |
|---|---|---|---|---|
| CN | 107264970 A | | 10/2017 | |
| JP | H07191516 A | * | 7/1995 | |
| JP | 11159551 A | * | 6/1999 | ............. F16F 1/043 |
| JP | 2008002677 A | * | 1/2008 | ............. F16F 1/025 |
| KR | 10-2000-0006845 A | | 2/2000 | |
| KR | 10-2002-0035811 A | | 5/2002 | |
| KR | 20020035811 | * | 5/2002 | |
| KR | 10-2016-0097607 A | | 8/2016 | |
| KR | 20160097607 A | * | 8/2016 | ............. A45D 34/04 |

\* cited by examiner

ELASTIC MEMBER AND PUMP ASSEMBLY COMPRISING SAME

TECHNICAL FIELD

The present invention relates to an elastic member and a pump assembly including the same, and more particularly, to an elastic member made of a soft plastic material and a pump assembly including the same.

BACKGROUND ART

In general, a pump container is configured so that contents are discharged to the outside through a pumping operation of a pump assembly coupled to an upper portion of a container body, and includes the container body in which the contents are stored, the pump assembly which is coupled to the upper portion of the container body and pumps the contents by making the inside of the container body in a vacuum state and performing a pumping operation, and a button part which is located at an upper portion of the pump assembly to move up and down according to user's pressure and to transmit pressure to the pump assembly.

Here, the pump assembly performs a pumping operation so that the contents stored in the container body are discharged to the outside and may include a spring which provides an elastic force therein for the repetitive pumping operation. In general, since the spring is made of a metal material, manufacturing costs thereof is high, and also since the pump assembly is made of different materials of plastic and a metal, the pump assembly has to be disassembled and scrapped for recycling, and thus there is a problem that recycling is not easy.

Technical Problem

The present invention is directed to providing an elastic member made of a soft plastic material and a pump assembly including the same.

The technical problems of the present invention are not limited to the technical problems described above, and other technical problems that are not described will be clearly understood by those skilled in the art from the following description.

Technical Solution

One aspect of the present invention provides an elastic member. The elastic member includes an upper support, a lower support provided under the upper support, and at least one elastic part configured to connect the upper support to the lower support, wherein the elastic part includes an upper support portion formed to extend downward from the upper support, a lower support portion configured to extend upwardly from the lower support, and a connecting portion configured to connect the upper support portion to the lower support portion with a predetermined inclination and to be bent and deformed when the elastic member is pressed.

A material of the elastic member may include at least one of polyetheretherketone (PEEK), polycarbonate (PC), polyoxymethylene (POM), polyketone (POK), and polybutylene terephthalate (PBT).

The upper support portion and the lower support portion may be formed in a direction perpendicular to the upper support and the lower support, respectively, to provide rigidity against deformation of the connecting portion.

Shapes of the upper support portion and the lower support portion may be fixed when pressure is applied on the elastic member.

When pressure is applied on the elastic member, the connecting portion may be bent in a region connected with the upper support and a region connected with the lower support.

A thickness of the connecting portion may increase from a center of the connecting portion toward the upper support portion and the lower support portion.

A thickness of the elastic part may increase from a center of the elastic part toward the upper support and the lower support.

When pressure is applied on the elastic member, while the lower support rotates in a first direction, some of the pressure may be relieved, and when the pressure on the elastic member is released, the lower support may be position-restored while rotating in a second direction opposite to the first direction, and rotation of the upper support may be limited.

The rotation of the upper support may be prevented by an anti-rotation protrusion or an anti-rotation groove connected to the upper support.

A stem connected to the upper support may be formed inside the upper support, and an anti-rotation protrusion or an anti-rotation groove may be formed at an outer surface of the stem to prevent the rotation of the upper support.

A coupling groove or coupling protrusion corresponding to the anti-rotation protrusion or the anti-rotation groove may be formed at an inner surface of a sealing part with which the stem is in close contact.

Another aspect of the present invention provides an elastic member. The elastic member includes an upper support, a lower support provided under the upper support, and at least one elastic part configured to connect the upper support to the lower support, wherein rotation of the upper support is prevented by an anti-rotation protrusion or an anti-rotation groove connected to the upper support.

When pressure is applied on the elastic member, while the lower support rotates in a first direction, some of the pressure may be relieved, and when the pressure on the elastic member is released, the lower support may restore a position thereof while rotating in a second direction opposite to the first direction, and rotation of the upper support may be limited.

Still another aspect of the present invention provides an elastic member. The elastic member includes an upper support, a lower support provided under the upper support, and at least one elastic part configured to connect the upper support to the lower support, wherein a stem connected to the upper support is formed inside the upper support, and an anti-rotation protrusion or an anti-rotation groove is formed at an outer surface of the stem to prevent rotation of the upper support.

A coupling groove or coupling protrusion corresponding to the anti-rotation protrusion or the anti-rotation groove may be formed at an inner surface of a sealing part with which the stem is in close contact.

Yet another aspect of the present invention provides a pump assembly. The pump assembly includes an elastic member, a cylinder having open upper and lower portions and a hollow formed therein, a seal cap provided on an inner wall of the cylinder, a sealing part coupled to a circumference of an upper end of the cylinder to suppress upward movement of the seal cap, a piston rod having an inlet port that is opened and closed by the seal cap at a lower end and a passage connected to the inlet port and formed up to an upper end thereof, and a stem coupled to move up and down together with the piston rod, wherein the elastic member is provided between the stem and the sealing part to provide an elastic force from the sealing part toward the stem.

The stem and the elastic member may be integrally formed.

Yet another aspect of the present invention provides a pump assembly. The pump assembly includes an elastic member, a cylinder having open upper and lower portions and a hollow formed therein, a seal cap provided on an inner wall of the cylinder, a sealing part coupled to a circumference of an upper end of the cylinder to suppress upward movement of the seal cap, and a piston rod having an inlet port that is opened and closed by the seal cap at a lower end and a passage connected to the inlet port and formed up to an upper end thereof, wherein a lower support of the elastic member is supported by an upper surface of the sealing part, the stem of the elastic member is coupled to move up and down together with the piston rod and is in close contact with an inner wall of the sealing part, the anti-rotation protrusion or the anti-rotation groove of the stem is coupled to a coupling groove or a coupling protrusion formed at the sealing part, and rotation of the upper support of the elastic member is prevented.

Yet another aspect of the present invention provides a pump container. The pump container includes a pump assembly, a container part configured to accommodate contents therein, a head part in which the pump assembly is provided therein and which is coupled to the container part, and a nozzle configured to receive an external force to press the pump assembly while moving up and down.

Advantageous Effects

According to the present invention, since a material of the elastic member is a soft plastic, it is possible to reduce costs through a simple structure, and it is environmentally friendly by solving the problem of disassembly and scrapping from other pump assemblies.

Further, according to the present invention, since the elastic member has rigidity suitable for the pumping operation, it is possible to transmit an appropriate repulsive force to a user when pressure is applied and to generate an elastic force for restoring an original state when the pressure is released.

Further, according to the present invention, since a lower end of the elastic member is allowed to rotate to relieve some of an external force when the pressure is applied, it is possible to enable soft and gentle elastic deformation.

Further, according to the present invention, since the elastic member is integrally formed with the stem, the elastic member does not move in a lateral direction and is fixed in position even when the pressure is applied on the elastic member and released.

Further, according to the present invention, since rotation of an upper end of the elastic member is prevented, it is possible to prevent unnecessary rotation of a nozzle in contact with the elastic member when the pressure is released.

DESCRIPTION OF DRAWINGS

In order to more fully understand the drawings recited in the detailed description, a brief description of each drawing is provided.

MODES OF THE INVENTION

Hereinafter, exemplary embodiments according to the present invention will be described in detail with reference to the contents described in the accompanying drawings. In addition, a method of configuring and using an apparatus according to the embodiments of the present invention will be described in detail with reference to the contents described in the accompanying drawings. The same reference numbers or reference numerals in each drawing indicate parts or components that perform substantially the same functions. For convenience described below, upward, downward, leftward and rightward directions are based on the drawings, and the scope of the present invention is not necessarily limited to the directions.

It will be understood that, although the terms "first," "second," or the like may be used herein to describe various elements, these elements should not be limited by these terms. These terms are only used to distinguish one element from another element. For example, a first element could be termed a second element, and, similarly, a second element could be termed a first element, without departing from the scope of the present invention. As used here, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Throughout the specification, when a certain part is connected to another part, it includes not only a case in which it is directly connected, but also a case in which it is indirectly connected with still another element interposed therebetween. In addition, when it is said that a part includes a certain component, this means that other components may be further included, rather than excluding other components, unless otherwise stated.

Figure 1:
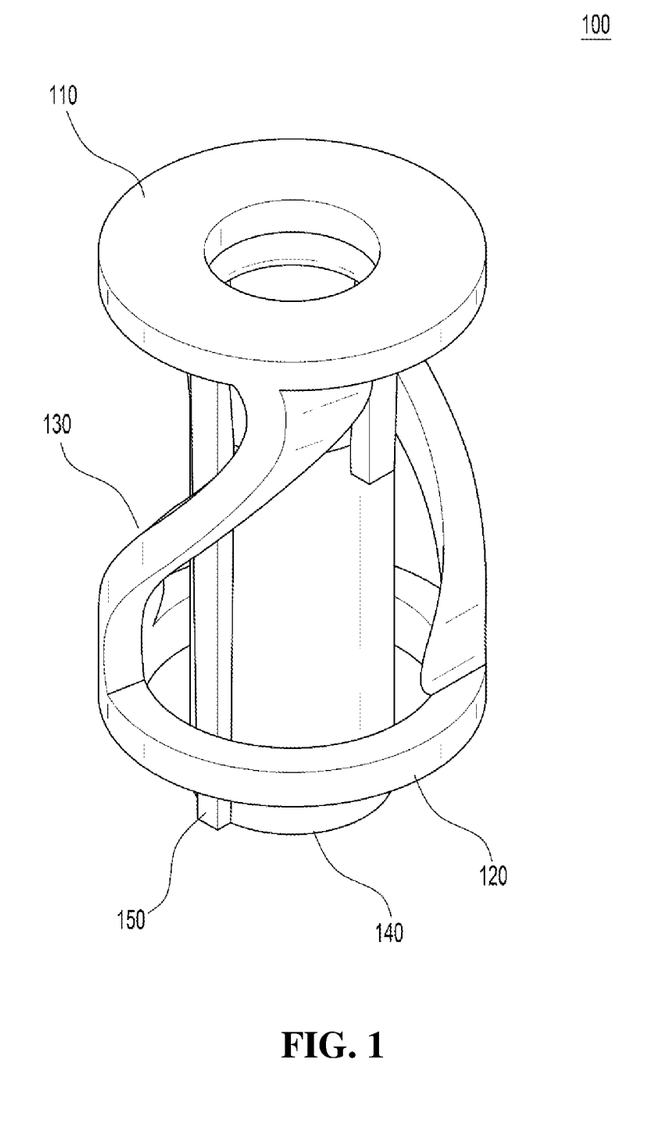
FIG. 1 illustrates a perspective view of an elastic member according to an embodiment of the present invention.
Figure 2:
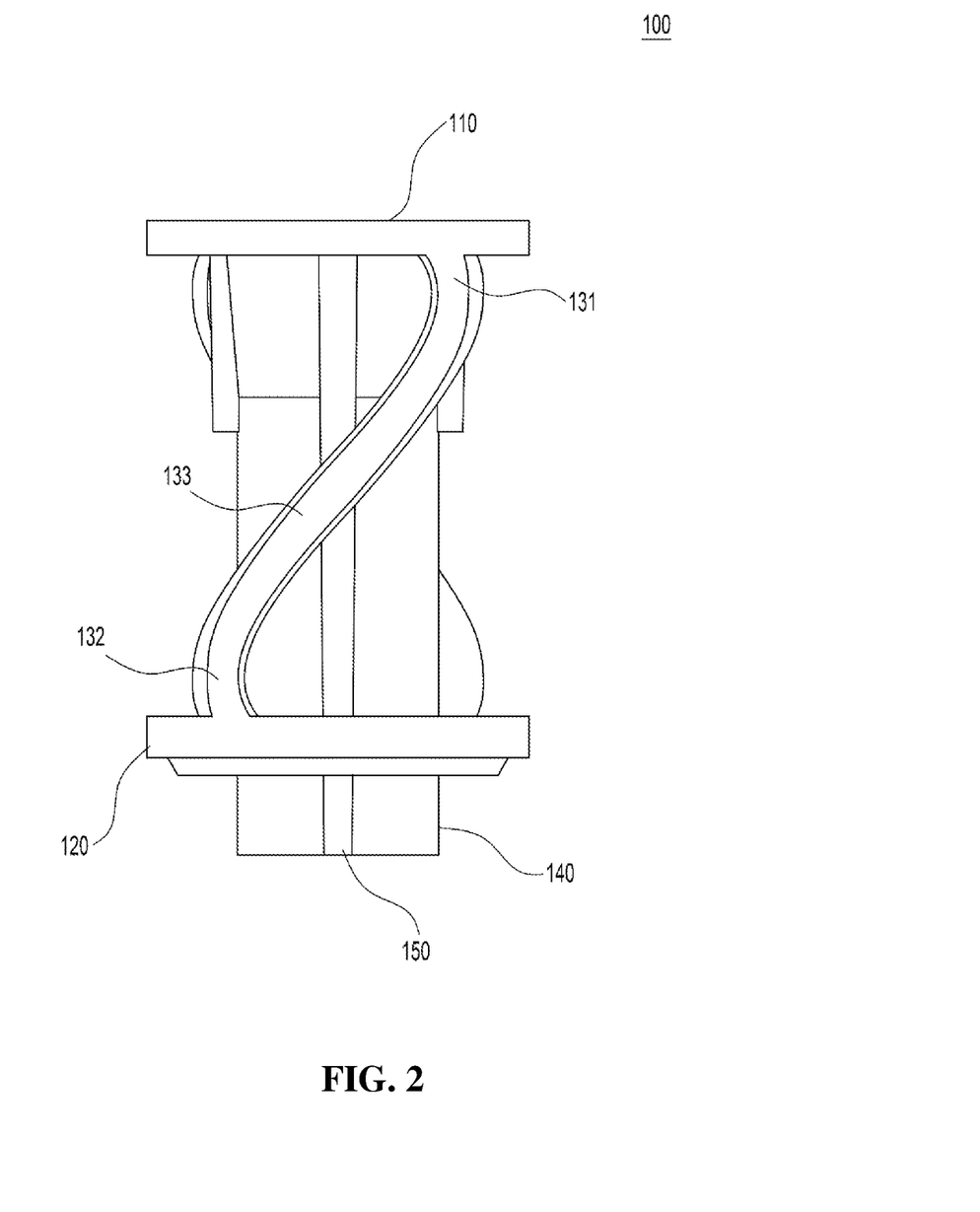
FIG. 2 illustrates a front view of the elastic member according to the embodiment of the present invention.
Figure 3:
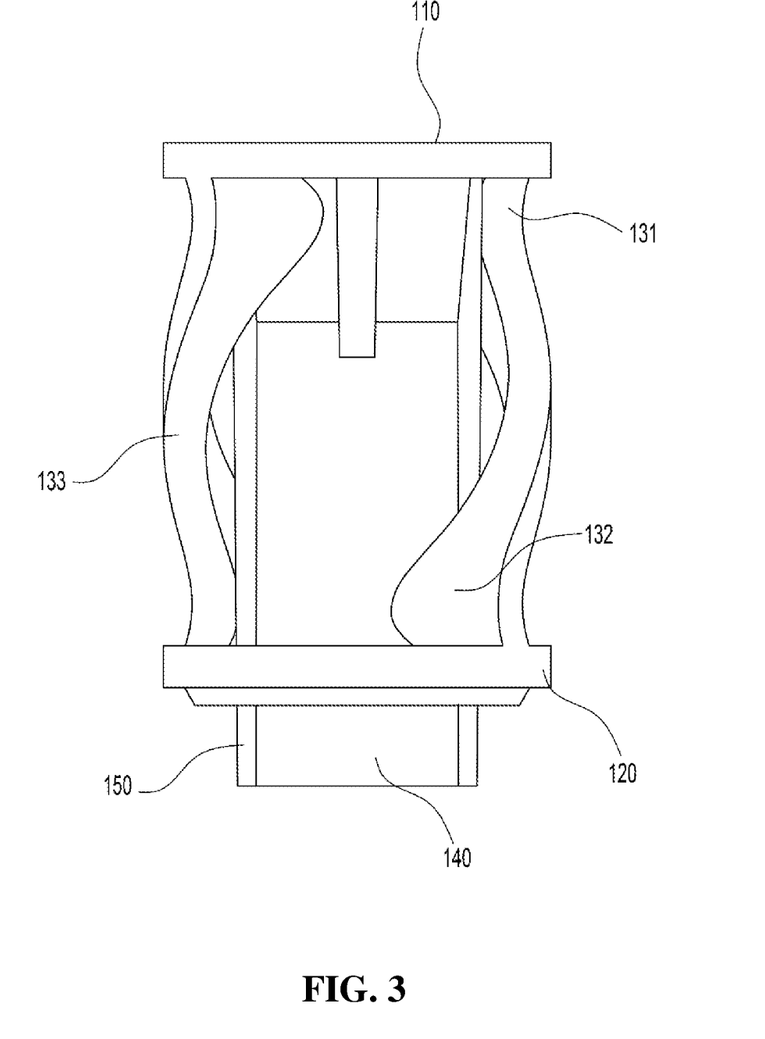
FIG. 3 illustrates a side view of the elastic member according to the embodiment of the present invention.

FIG. 1 illustrates a perspective view of an elastic member according to an embodiment of the present invention, FIG. 2 illustrates a front view of the elastic member according to the embodiment of the present invention, and FIG. 3 illustrates a side view of the elastic member according to the embodiment of the present invention.

Referring to FIGS. 1 to 3, an elastic member 100 may include an upper support 110, a lower support 120, and an elastic part 130.

The upper support 110, the lower support 120, and the elastic part 130 of the elastic member 100 may each be made of a soft plastic material. For example, the soft plastic material may include polyetheretherketone (PEEK), polycarbonate (PC), polyoxymethylene (POM), polyketone (POK), polybutylene terephthalate (PBT), or the like. However, the present invention is not limited thereto. As described above, due to use of the soft plastic as a material, it is possible to easily manufacture the elastic member 100 and at the same time to reduce production costs compared to the conventional spring made of a metal material. Further, since a weight thereof is lighter than the conventional metal spring, a weight of a pump assembly 200 and the container including the elastic member 100 can be reduced, and thus easy portability and convenience in use can be provided. In addition, it is environmentally friendly by solving the problem of disassembly and scrapping from other components of the pump assembly 200.

According to an embodiment, the upper support 110, the lower support 120, and the elastic part 130 of the elastic member 100 may have the same material or different materials. Further, according to an embodiment, the upper support 110, the lower support 120, and the elastic part 130 of the elastic member 100 may be integrally formed or may be formed separately and then assembled.

In an embodiment, the upper support 110, the lower support 120, and the elastic part 130 of the elastic member 100 may be integrally formed of the same material. In this case, the material may include at least one of polyetheretherketone (PEEK), polycarbonate (PC), polyoxymethylene (POM), polyketone (POK), and polybutylene terephthalate (PBT).

The upper support 110 may support an upper end of the elastic part 130. When pressure is applied on the elastic member 100, as the upper support 110 moves down, the pressure may be transferred to the elastic part 130, and when the pressure is released, the upper support 110 may be restored while moving up and down by an elastic force of the elastic part 130.

The lower support 120 may be provided under the upper support 110. The lower support 120 may support a lower end of the elastic part 130. The lower support 120 does not move up and down but supports the elastic part 130, and thus the elastic force of the elastic part 130 can be directed toward the upper support 110.

The upper support 110 and the lower support 120 having a hollow inside, so that a configuration such as a stem 140 of the pump assembly 200 is located inside the upper support 110 and the lower support 120. For example, the upper support 110 and the lower support 120 may have a circular ring shape.

The elastic part 130 may connect the upper support 110 to the lower support 120. When pressure is applied on the elastic member 100, the elastic part 130 may generate an elastic force while being bent and deformed (that is, elastically compressed). When the pressure on the elastic member 100 is released, the elastic part 130 may be restored to an original state while the bending deformation is also released.

In an embodiment, the elastic part 130 may be provided as at least one elastic part, and each elastic part 130 may include an upper support portion 131 formed to extend downward from the upper support 110; a lower support portion 132 which extends upward from the lower support 120; and a connecting portion 133 which connects the upper support portion 131 to the lower support portion 132.

At this time, a formation position of the upper support portion 131 and a formation position of the lower support portion 132 may be different from each other in a circumferential direction of each of the upper support 110 and the lower support 120. Thus, the connecting portion 133 may connect the upper support portion 131 to the lower support portion 132 while having a predetermined inclination. The connecting portion 133 may be bent and deformed when the pressure is applied on the elastic member 100, and may be restored to an original state when the pressure is released. Deformation of the connecting portion 133 may mainly occur at an upper end and a lower end of the connecting portion 133 (that is, connection regions 134 and 135 between the upper support portion 131 and the lower support portion 132 in the connecting portion 133).

In an embodiment, the upper support portion 131 and the lower support portion 132 may be formed in a direction perpendicular to the upper support 110 and the lower support 120, respectively. Since the upper support portion 131 and the lower support portion 132 are formed in a vertical direction, rigidity against bending deformation of the connecting portion 133 connected thereto may be provided. The rigidity of the upper support portion 131 and the lower support portion 132 may act in a direction to limit the bending deformation of the connecting portion 133 and may prevent the connecting portion 133 from being easily and excessively bent. Further, when the connecting portion 133 is bent and deformed, the upper support portion 131 and the lower support portion 132 may assist the connecting portion 133 to restore to the original state. The fact that the upper support portion 131 and the lower support portion 132 are formed in the vertical direction may means that the upper support portion 131 and the lower support portion 132 (central axes of the upper support portion 131 and the lower support portion 132) are formed to have an angle of, for example, 70 to 110 degrees, 80 to 100 degrees, 85 to 95 degrees, or 90 degrees with respect to the upper support 110 and the lower support 120. However, the present invention is not limited to these angle values.

In an embodiment, the elastic force and the restoring force of the elastic member 100 may be adjusted by adjusting the rigidity of the upper support portion 131 and the lower support portion 132. For example, when the rigidity of the upper support portion 131 and the lower support portion 132 is relatively low, the upper support portion 131 and the lower support portion 132 are elastically deformed when the pressure is applied on the elastic member 100, and the degree of deformation may be small (in particular, compared to the bending deformation of the connecting portion 133). Further, for example, when the rigidity of the upper support portion 131 and the lower support portion 132 is relatively high, the upper support portion 131 and the lower support portion 132 do not elastically deform and may be fixed in shape even when the pressure is applied on the elastic member 100.

In an embodiment, a thickness of the elastic part 130 and/or the connecting portion 133 may be adjusted so that the bending deformation of the elastic part 130 and/or the connecting portion 133 may be facilitated. That is, the bending may be easily performed in a region having a relatively thin thickness, and the bending may not be made or may be limitedly performed in a region having a relatively thick thickness. For example, the thickness of the connecting portion 133 may increase from the center of the connecting portion 133 toward the upper support portion 131 and the lower support portion 132. For example, the thickness of the elastic part 130 may increase from the center of the elastic part 130 toward the upper support 110 and the lower support 120. For example, the elastic part 130 may have horizontal cross-sections having different areas, and the areas may increase from the center of the elastic part 130 toward the upper support 110 and the lower support 120. For example, the connecting portion 133 may be bent in the connection regions 134 and 135 between the upper support portion 131 and the lower support portion 132 by making the thickness of the upper support portion 131 and the lower support portion 132 greater than the thickness of the connecting portion 133. At this time, the thickness is gradually changed in a direction from the upper support portion 131 and the lower support portion 132 to the connecting portion 133, so that bending and bending release can be naturally performed.

In an embodiment, when pressure is applied on the elastic member 100, the lower support 120 may rotate in a first direction while the upper support 110 moves down. Bending deformation of the elastic part 130 may be made in a narrow range compared to a moving-down length of the upper support 110 by the lower support portion 132 rotating in a state in which the upper support portion 131 is fixed. That is, it is possible to relieve some of a pressing force so that the elastic part 130 may be bent more gently and smoothly.

In an embodiment, when the pressure on the elastic member 100 is released, the lower support 120 may be position-restored while rotating in a second direction opposite to the first direction. That is, in a process in which the pressure is applied on the elastic member 100 or releases, the upper support 110 is prevented from rotating, and only the lower support 120 can rotate. To this end, various configurations may be applied. For example, an anti-rotation protrusion 150 or an anti-rotation groove connected to the upper support 110 may be formed. The rotation of the upper support 110 may be prevented by the anti-rotation protrusion 150 or the anti-rotation groove being coupled to other component of the pump assembly 200 such as a sealing part 230.

In an embodiment, the elastic member 100 may further include the stem 140. The stem 140 may be provided inside the upper support 110 and may be connected to the upper support 110. The upper support 110 and the stem 140 may be integrally formed or may be separately formed to be assembled. The stem 140 and the upper support 110 may have the same material or different materials. In this case, the material may include, for example, at least one of polyetheretherketone (PEEK), polycarbonate (PC), polyoxymethylene (POM), polyketone (POK), or polybutylene terephthalate (PBT). For example, the stem 140 may be integrally formed of the same material as that of the upper support 110. In an additional embodiment, the anti-rotation protrusion 150 or the anti-rotation groove may be formed at the stem 140. For example, the anti-rotation protrusion 150 or the anti-rotation groove may be formed at an outer surface of a lower end of the stem 140. For example, the stem 140 is inserted inside the sealing part 230 of the pump assembly 200, and an outer surface of the stem 140 and an inner surface of the sealing part 230 may be in close contact with each other. At this time, the anti-rotation protrusion 150 or the anti-rotation groove of the stem 140 may be coupled to a coupling groove 231 or a coupling protrusion of the sealing part 230, and thus, the rotation of the stem 140 and the upper support 110 can be prevented.

Figure 4:
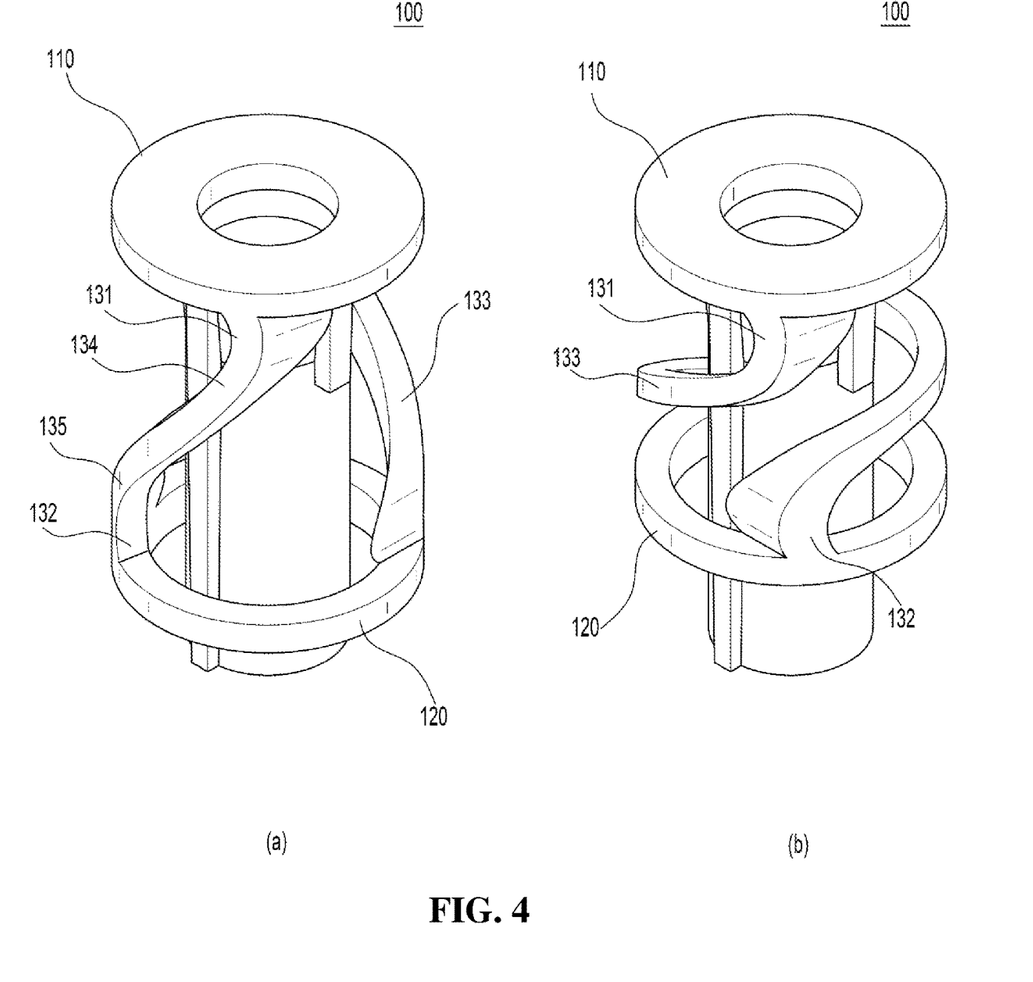
FIG. 4 illustrates an operation of the elastic member according to the embodiment of the present invention.

FIG. 4 illustrates an operation of the elastic member according to the embodiment of the present invention.

FIG. 4A illustrates the elastic member 100 before pressure is applied, and FIG. 4B illustrates the elastic member 100 after pressure is applied.

As illustrated, when pressure is applied on the elastic member 100, the upper support 110 may move downward. In this process, the elastic part 130 may be elastically compressed.

The upper support portion 131 and the lower support portion 132 are formed in the vertical direction to provide rigidity against the bending deformation of the connecting portion 133. The rigidity of the upper support portion 131 and the lower support portion 132 may provide a repulsive force to a user when the pressure is applied on the elastic member 100, and may also prevent the upper support 110 from excessively moving down. Deformation of the connecting portion 133 may mainly occur at an upper end and a lower end of the connecting portion 133 (that is, the connection region 134 with the upper support portion 131 and the connection region 135 with the lower support portion 132 in the connecting portion 133) due to rigidity. In addition, when the pressure is released, the rigidity may assist the bent and deformed connecting portion 133 to restore a shape thereof. Accordingly, the upper support 110 may stably move upward.

Meanwhile, unlike the upper support 110 which is rotationally fixed, the lower support 120 may relieve some of the pressing force while pressure is applied. By some of the pressing force being converted into a rotational force of the lower support 120, it is possible to prevent the connecting portion 133 from being excessively bent or to prevent occurrence of damage to a portion between the upper support portion 131 and the lower support portion 132 that provide rigidity due to excessive force. When the pressure is released, as the shape of the elastically compressed connecting portion 133 is restored, the lower support 120 also rotates in the opposite direction to restore the original position.

In FIG. 4, the elastic member 100 is illustrated to include the stem 140 and the anti-rotation protrusion 150, but this is just exemplary, and according to an embodiment, at least one of the stem 140 and the anti-rotation protrusion 150 may be excluded from the elastic member 100.

Figure 5:
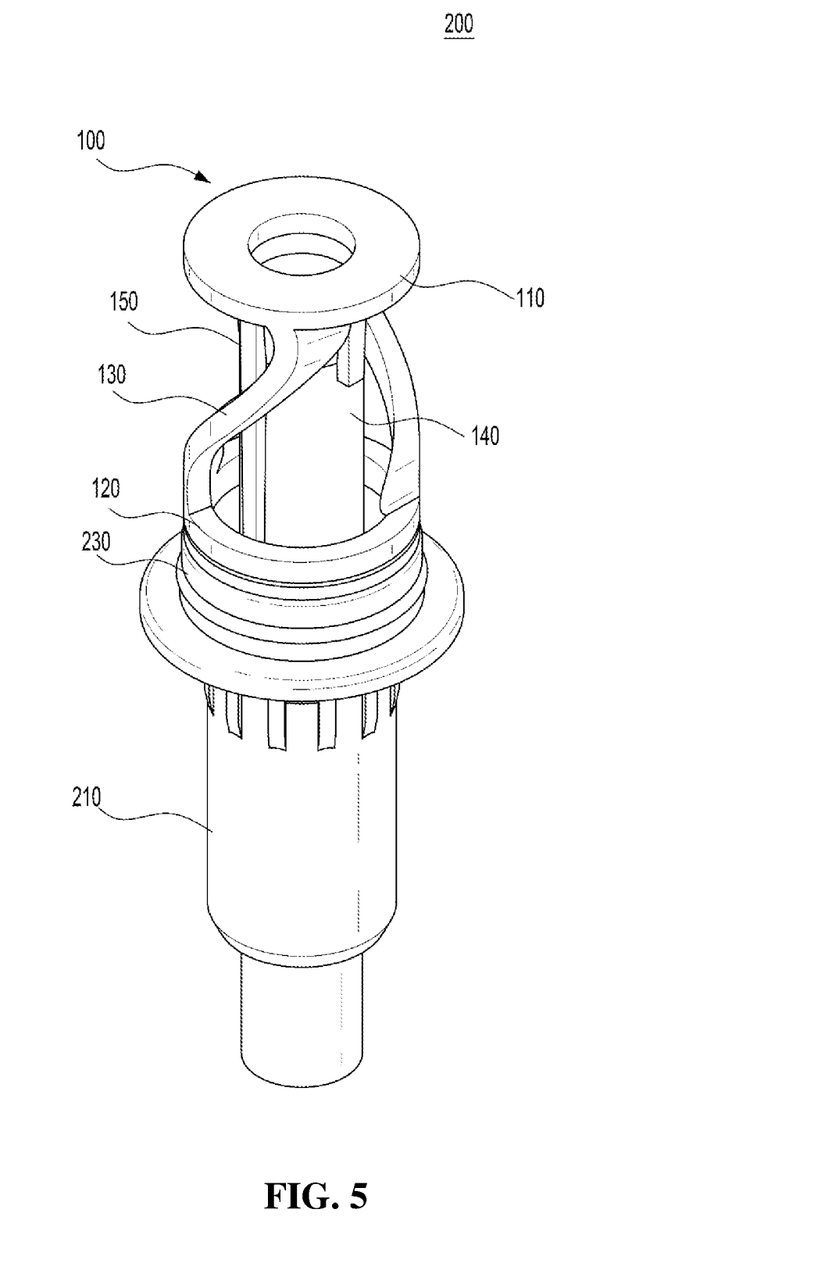
FIG. 5 illustrates a perspective view of a pump assembly according to an embodiment of the present invention.
Figure 6:
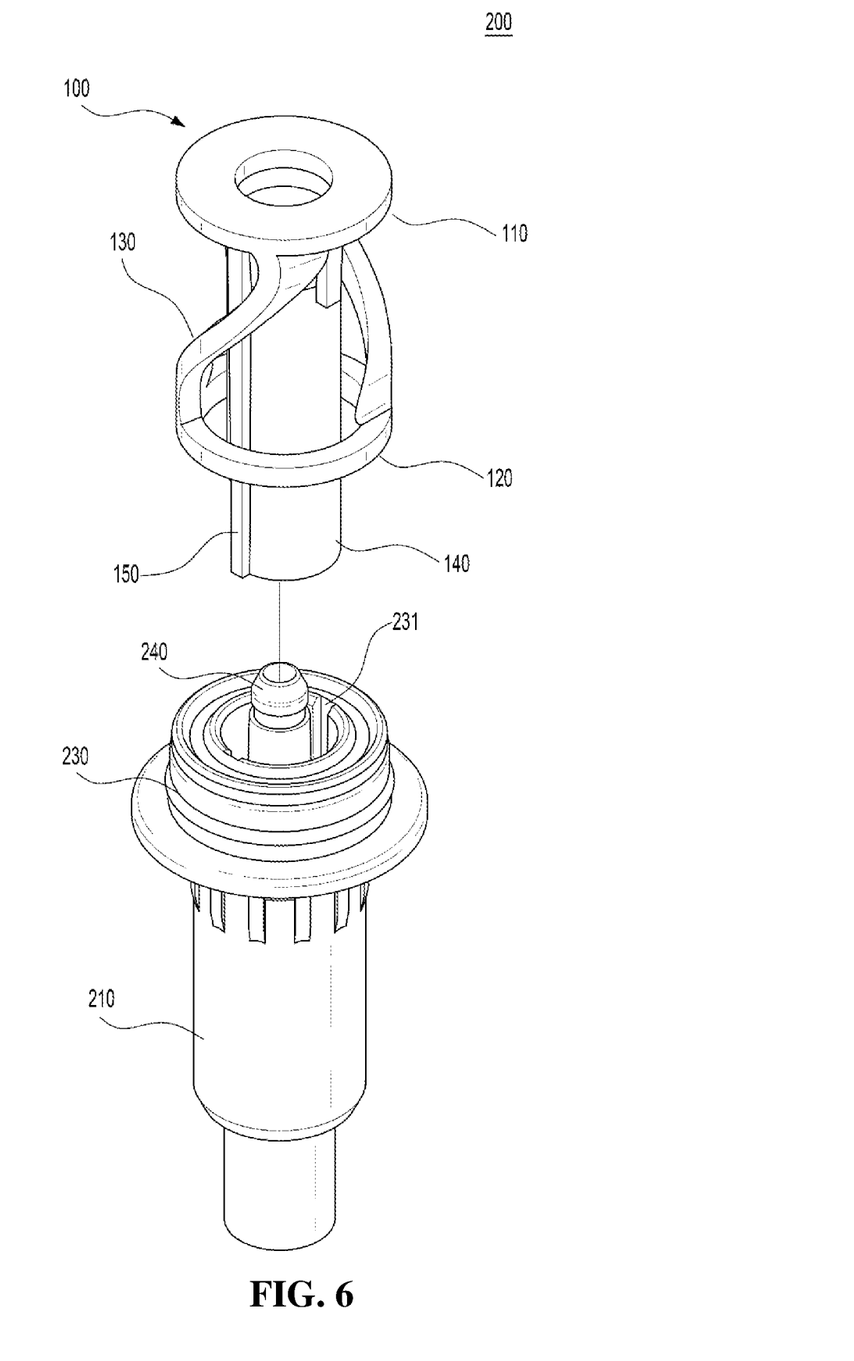
FIG. 6 illustrates an exploded view of the pump assembly according to the embodiment of the present invention.
Figure 7:
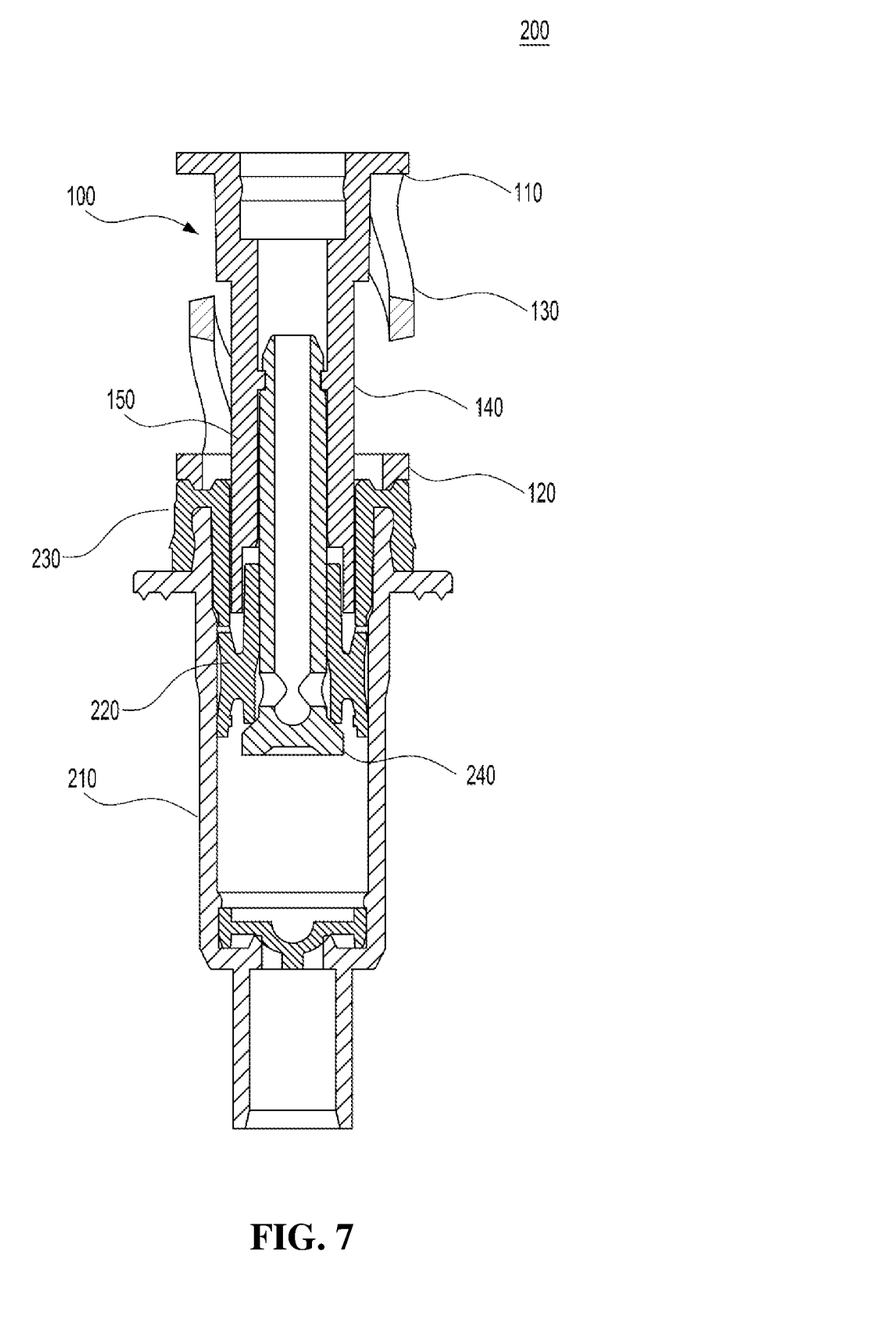
FIG. 7 illustrates a cross-sectional view of the pump assembly according to the embodiment of the present invention.

FIG. 5 illustrates a perspective view of a pump assembly according to an embodiment of the present invention, FIG. 6 illustrates an exploded view of the pump assembly according to the embodiment of the present invention, and FIG. 7 illustrates a cross-sectional view of the pump assembly according to the embodiment of the present invention.

Referring to FIGS. 5 to 7, the pump assembly 200 receives an external force from a user, causes a pressure change therein, and introduces and discharges contents therethrough, and specifically, the pump assembly 200 may include a cylinder 210, a seal cap 220, a sealing part 230, a piston rod 240, and the elastic member 100.

The cylinder 210 may provide a space which vertically passes through the cylinder 210 and through which the contents are introduced or discharged. The cylinder 210 is located inside a spout of a container (not shown), but a seating wing is formed on the outside thereof, and thus the cylinder 210 can be seated on the spout of the container. A lower end of the cylinder 210 may be formed to extend toward the inside of the container, and an inlet that communicates with the container may be formed. A valve may be provided at or adjacent to the inlet. The valve is a check valve, and may close the inlet when an internal pressure of the cylinder 210 is a positive pressure and may open the inlet when the internal pressure of the cylinder 210 changes to a negative pressure.

The seal cap 220 is to open and close the piston rod 240, and an outer surface thereof may be in close contact with the cylinder 210 and an inner surface thereof may be in close contact with the piston rod 240. A lower end of the inner surface of the seal cap 220 is in close contact with a support portion of the piston rod 240 to seal an inlet port of the piston rod 240, and when the piston rod 240 moves down with respect to the seal cap 220, the lower end of the seal cap 220 moves away from the support portion of the piston rod 240, and the inlet port is opened to communicate with the inside of the cylinder 210.

The sealing part 230 is coupled to an upper end of the cylinder 210, and a lower end thereof is configured to extend inside the cylinder 210, and thus upward movement of the seal cap 220 can be suppressed. A downwardly bent outer wall may be formed on the outside of the sealing part 230. The upper end of the cylinder 210 may be inserted into a space formed between an inner wall and an outer wall of the sealing part 230.

The piston rod 240 may be provided inside the cylinder 210, a lower side thereof may be surrounded by the seal cap 220, and an upper side thereof may be connected to the stem 140. The piston rod 240 has a hollow tube shape, an inlet port which is opened and closed by the seal cap 220 may be formed at a lower side of the piston rod 240, and an outlet port through which contents introduced through the inlet port are discharged may be formed at an upper side of the piston rod 240. Further, the support portion is formed at the lower end of the piston rod 240, and when the lower end of the inner surface of the seal cap 220 is in close contact with the support portion, the inlet port can be sealed from the inner space of the cylinder 210. The piston rod 240 is movable inside the cylinder 210 in the vertical direction by the stem 140. When the piston rod 240 moves down, as the lower end of the inner surface of the seal cap 220 is spaced apart from the support portion, the inlet port is opened, and thus the contents inside the cylinder 210 can flow into the piston rod 240. When the piston rod 240 continues to move, the contents may be discharged through the outlet port, may pass through the stem 140 and then may be discharged through a discharge hole of a nozzle 330. When the piston rod 240 moves upward, the cylinder 210 may close the inlet port of the piston rod 240, a negative pressure is generated inside the cylinder 210, and thus the contents in a container part 310 may flow into the cylinder 210.

The elastic member 100 is to position-restore the piston rod 240, and the lower support 120 may be supported by the sealing part 230. The stem 140 may be connected to the upper support 110 of the elastic member 100. Here, the lower end of the stem 140 is coupled to the piston rod 240, and the stem 140 has a space vertically passing therethrough so that the contents introduced from the piston rod 240 can move upward. When the user presses the pump assembly 200, the elastic part 130 may be compressed while the upper support 110 and the stem 140 move downward. At this time, the piston rod 240 coupled to the stem 140 may also move downward. In addition, when the user releases the pressure, the elastic force of the elastic part 130 may restore the upper support 110 and the stem 140 upward. At this time, the piston rod 240 coupled to the stem 140 may also move upward.

In an embodiment, the anti-rotation protrusion 150 is formed at the lower end of the stem 140, and the coupling groove 231 may be formed in the inner surface of the sealing part 230 corresponding thereto. When the lower support 120 is in contact with the upper surface of the sealing part 230, the anti-rotation protrusion 150 can be coupled to the coupling groove 231 while the lower end of the stem 140 is inserted into the sealing part 230. Thus, rotation of the stem 140 and the upper support 110 can be prevented. In addition, the lower support 120 located on the upper surface of the sealing part 230 may rotate according to pressure application and pressure release without such limitation.

In FIGS. 5 to 7, although the elastic member 100 is illustrated to include the stem 140, this is just exemplary, and the elastic member 100 and the stem 140 may be formed separately as separate parts according to an embodiment. At this time, the stem 140 may have a wing portion formed outside the upper end thereof, and the upper support 110 of the elastic member 100 may be supported by a lower surface of the wing portion. In an additional embodiment, the anti-rotation protrusion 150 or the anti-rotation groove may be formed in the elastic member 100, and the anti-rotation protrusion 150 or the anti-rotation groove may be coupled to the coupling groove 231 formed in the sealing part 230. At this time, the stem 140 may be prevented from rotating by the sealing part 230 or the like. Thus, rotation of the upper support 110 of the elastic member 100 may also be prevented.

Figure 8:
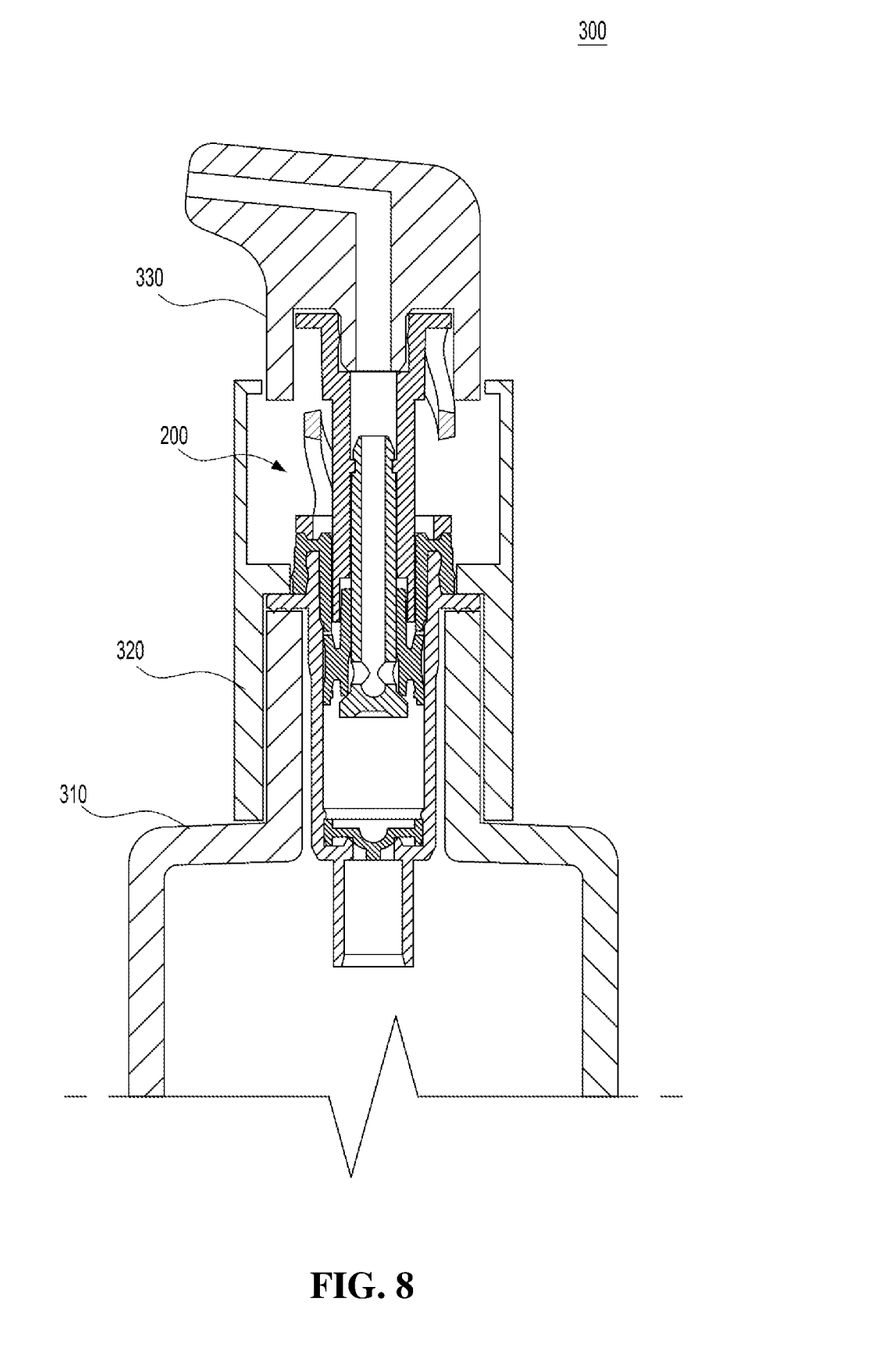
FIG. 8 is a cross-sectional view of a pump container according to an embodiment of the present invention.

FIG. 8 is a cross-sectional view of a pump container according to an embodiment of the present invention.

Referring to FIG. 8, a pump container 300 may include the pump assembly 200, the container part 310, a head part 320, and the nozzle 330.

The container part 310 may provide an accommodation space in which the contents are accommodated. The contents accommodated in the container part 310 may be discharged to the outside through the nozzle 330 and the like to be used by the user. Here, the content may be, for example, cosmetics (that is, cosmetic materials) or drugs, but the present invention is not limited thereto, and the contents may include substances of various kinds or components that can be accommodated in the container part 310 and can be discharged through the nozzle 330. The types of the contents such as liquid, gel, powder, and the like may also be varied. In addition, although the container part 310 is shown as a bottle type, this is just exemplary, and various types of container parts 310 such as a tube and a tottle can be applied.

The pump assembly 200 (in particular, the wing portion of the cylinder 210) may be seated on the upper end of the container part 310. The contents accommodated in the container part 310 may be discharged to the outside by the pump assembly 200. The head part 320 may be coupled to the outside of the spout portion of the container part 310. The head part 320 may provide therein a space in which the pump assembly 200 is provided and a space in which a part of the nozzle 330 is movable and may press and fix the pump assembly 200 through the coupling between the head part 320 and the container part 310.

The nozzle 330 may receive the user's external force, may transmit the external force to the pump assembly 200, and may discharge the contents discharged from the pump assembly 200 to the outside. The nozzle 330 may move up and down by receiving the external force from the user at an upper side thereof and may be adhered to the upper support 110 of the elastic member 100 at a lower side thereof. Movement of the nozzle 330 may cause downward movement of the upper support 110.

Since the upper support 110 of the elastic member 100 is in contact with the nozzle 330, when the upper support 110 rotates, the nozzle 330 may also rotate together with the upper support 110. In particular, when the external force is removed and the pressure is released, the nozzle 330 easily rotates. Thus, an orientation of the discharge hole of the nozzle 330 or a pressure application surface formed on an upper portion of the nozzle 330 is changed, which may cause inconvenience in use.

In order to solve the problem, while the elastic member 100 allows the lower support 120 to rotate, the stem 140 and the anti-rotation protrusion 150 formed on the stem 140 are coupled to the coupling groove 231 of the sealing part 230 to fix the rotation of the upper support 110 connected to the stem 140. Thus, it is possible to prevent unnecessary rotation of the nozzle 330 in contact with the elastic member 100 when the pressure is released.

In the above, the coupling between the components has been described as coupling between the protrusions and the grooves and the coupling between the protrusions and the protrusions, but these are just exemplary, and various coupling methods are applicable according to an embodiment. For example, the protrusion and the groove may be changed to each other, or screw coupling may be applied.

As described above, although embodiments have been described with reference to the limited examples and drawings, various modifications and variations are possible from the above description by those skilled in the art. In addition, each of the embodiments may be applied in combination with each other as needed. Therefore, other implementations, other embodiments, and equivalents to the claims are also within the scope of the following claims.

The invention claimed is:

1. An elastic member comprising:
an upper support;
a lower support disposed under the upper support; and
at least one elastic part connecting the upper support to the lower support,
wherein the at least one elastic part comprises: an upper support portion extending downward from the upper support; a lower support portion extending upwardly from the lower support; and a connecting portion connecting the upper support portion to the lower support portion with a predetermined inclination, wherein the connecting portion is configured to be bent and deformed when the elastic member is pressed,
wherein, when pressure is applied on the elastic member, the lower support rotates in a first direction and some of the pressure is relieved, and
when the pressure on the elastic member is released, the lower support rotates in a second direction opposite to the first direction and is position-restored, and rotation of the upper support is limited.

2. The elastic member of claim 1, wherein a material of the elastic member includes at least one of polyetheretherketone (PEEK), polycarbonate (PC), polyoxymethylene (POM), polyketone (POK), and polybutylene terephthalate (PBT).

3. The elastic member of claim 1, wherein the upper support portion and the lower support portion extend in a direction perpendicular to the upper support and the lower support, respectively, to provide rigidity against a deformation of the connecting portion.

4. The elastic member of claim 3, wherein shapes of the upper support portion and the lower support portion are fixed when pressure is applied on the elastic member.

5. The elastic member of claim 3, wherein, when pressure is applied on the elastic member, the connecting portion is bent in a region connected with the upper support portion and a region connected with the lower support portion.

6. The elastic member of claim 1, wherein a thickness of the connecting portion increases from a center of the connecting portion toward the upper support portion and the lower support portion.

7. The elastic member of claim 1, wherein a thickness of the at least one elastic part increases from a center of the at least one elastic part toward the upper support and the lower support.

8. The elastic member of claim 1, wherein the rotation of the upper support is prevented by an anti-rotation protrusion or an anti-rotation groove connected to the upper support.

9. The elastic member of claim 1, wherein a stem connected to the upper support is disposed inside the upper support, and
an anti-rotation protrusion or an anti-rotation groove is disposed at an outer surface of the stem to prevent the rotation of the upper support.

10. The elastic member of claim 9, wherein the stem is configured to be in close contact with a sealing part, and
wherein a coupling groove or a coupling protrusion corresponding to the anti-rotation protrusion or the anti-rotation groove, respectively, is disposed at an inner surface of the sealing part.

11. A pump assembly comprising:
the elastic member of claim 9;
a cylinder having open upper and lower portions and a hollow formed therein;
a seal cap disposed on an inner wall of the cylinder;
a sealing part coupled to a circumference of an upper end of the cylinder to suppress upward movement of the seal cap; and
a piston rod having an inlet port that is opened and closed by the seal cap at a lower end thereof and a passage connected to the inlet port and extending up to an upper end thereof,
wherein the lower support of the elastic member is supported by an upper surface of the sealing part,
the stem of the elastic member is coupled with the piston rod and is in close contact with an inner wall of the sealing part and is configured to move up and down together with the piston rod, and
the anti-rotation protrusion or the anti-rotation groove of the stem is respectively coupled to a coupling groove or a coupling protrusion disposed on the sealing part, and the rotation of the upper support of the elastic member is prevented.

12. A pump assembly comprising:
the elastic member of claim 1;
a cylinder having open upper and lower portions and a hollow formed therein;
a seal cap disposed on an inner wall of the cylinder;
a sealing part coupled to a circumference of an upper end of the cylinder to suppress upward movement of the seal cap;
a piston rod having an inlet port that is opened and closed by the seal cap at a lower end thereof and a passage connected to the inlet port and extending up to an upper end thereof; and
a stem coupled with the piston rod and configured to move up and down together with the piston rod,
wherein the elastic member is disposed between the stem and the sealing part and provides an elastic force from the sealing part toward the stem.

13. The pump assembly of claim 12, wherein the stem and the elastic member are integrally formed.

* * * * *